United States Patent
Hori et al.

(10) Patent No.: US 8,277,126 B2
(45) Date of Patent: Oct. 2, 2012

(54) FLUID DYNAMIC BEARING DEVICE

(75) Inventors: Masaharu Hori, Kuwana (JP);
Shigeharu Sumi, Kyoto (JP)

(73) Assignees: NTN Corporation, Osaka-shi (JP);
Nidec Corporation, Kyoto-shi (JP)

( * ) Notice: Subject to any disclaimer, the term of this patent is extended or adjusted under 35 U.S.C. 154(b) by 406 days.

(21) Appl. No.: 12/595,123

(22) PCT Filed: Apr. 28, 2008

(86) PCT No.: PCT/JP2008/058165
§ 371 (c)(1),
(2), (4) Date: Oct. 8, 2009

(87) PCT Pub. No.: WO2008/139911
PCT Pub. Date: Nov. 20, 2008

(65) Prior Publication Data
US 2010/0166345 A1    Jul. 1, 2010

(30) Foreign Application Priority Data
May 7, 2007 (JP) .................... 2007-122654

(51) Int. Cl.
*F16C 32/06* (2006.01)
(52) U.S. Cl. ........................ 384/107; 384/100
(58) Field of Classification Search ........... 384/100, 384/107, 112–115, 120–121
See application file for complete search history.

(56) References Cited

U.S. PATENT DOCUMENTS

| | | | |
|---|---|---|---|
| 3,758,177 A | 9/1973 | Williams | |
| 6,033,118 A | 3/2000 | Asai et al. | |
| 6,074,098 A | 6/2000 | Asai et al. | |
| 6,390,681 B1 | 5/2002 | Nakazeki et al. | |
| 6,554,475 B2 | 4/2003 | Yamada | |
| 6,980,394 B2 * | 12/2005 | Inoue et al. | 384/112 |
| 6,982,513 B2 * | 1/2006 | Fujii et al. | 310/254.1 |
| 7,514,831 B2 * | 4/2009 | Tamaoka | 310/67 R |
| 2002/0064324 A1 | 5/2002 | Yamada | |

(Continued)

FOREIGN PATENT DOCUMENTS

CN    1853051 A    10/2006

(Continued)

OTHER PUBLICATIONS

Chinese Office Action dated Nov. 1, 2010, issued in corresponding Chinese Patent Application No. 200880015099.5.

(Continued)

*Primary Examiner* — Marcus Charles
(74) *Attorney, Agent, or Firm* — Westerman, Hattori, Daniels & Adrian, LLP

(57) ABSTRACT

A protrusion (7*b*3) directed axially downwards is provided at a bottom portion (7*b*) of a housing (7), and an outer peripheral surface (7*b*31) of the protrusion (7*b*3) is fixed to an inner peripheral surface (6*a*) of a bracket (6). When a thrust load is applied to the bottom portion (7*b*) of the housing (7), a part of the load is supported by the bracket (6) via the protrusion (7*b*3). Thus, a strength of a boundary portion (P) between a side portion (7*a*) and the bottom portion (7*b*) of the housing (7) increases, making it possible to prevent rupture of the boundary portion (P) due to an excessive thrust load. On the other hand, a wall thickness of the bottom portion (7*b*) can be made invariable, so it is possible to suppress deformation through molding shrinkage of a thrust bearing surface formed on an inner end surface (7*b*1) of the bottom portion (7*b*).

4 Claims, 6 Drawing Sheets

U.S. PATENT DOCUMENTS

| | | | |
|---|---|---|---|
| 2002/0122609 A1* | 9/2002 | Gomyo | 384/107 |
| 2004/0042695 A1* | 3/2004 | Shishido et al. | 384/107 |
| 2004/0258335 A1* | 12/2004 | Shimizu et al. | 384/100 |
| 2005/0286167 A1* | 12/2005 | Yonei et al. | 360/99.08 |
| 2006/0072242 A1* | 4/2006 | Tamaoka | 360/99.08 |
| 2006/0221495 A1* | 10/2006 | Tamaoka et al. | 360/99.08 |
| 2007/0092170 A1 | 4/2007 | Satoji et al. | |
| 2007/0104400 A1* | 5/2007 | Ito et al. | 384/107 |
| 2007/0286538 A1 | 12/2007 | Mizutani | |
| 2008/0011551 A1 | 1/2008 | Inazuka et al. | |

FOREIGN PATENT DOCUMENTS

| | | | |
|---|---|---|---|
| CN | 1946944 A | | 4/2007 |
| JP | 07063220 A | * | 3/1995 |
| JP | 10-246223 A | | 9/1998 |
| JP | 10-306822 A | | 11/1998 |
| JP | 10-318271 A | | 12/1998 |
| JP | 10-331841 A | | 12/1998 |
| JP | 2001-295846 A | | 10/2001 |
| JP | 2002-168240 A | | 6/2002 |
| JP | 2003-083347 A | | 3/2003 |
| JP | 2006-118705 A | | 5/2006 |
| JP | 2008 190711 A | * | 8/2008 |
| KR | 2000-0071559 A | | 11/2000 |
| WO | 2005/028892 A1 | | 3/2005 |
| WO | 2005/098252 A1 | | 10/2005 |
| WO | 2006/035665 A1 | | 4/2006 |

OTHER PUBLICATIONS

International Search Report of PCT/JP2008/058165, Mailing Date of May 27, 2008.

Notification of Transmittal of Translation of the International Preliminary Report on Patentability (Form PCT/IB/338) of International Application No. PCT/JP2008/058165 mailed Dec. 3, 2009 with Forms PCT/IB/373 and PCT/ISA/237.

Korean Office Action dated Mar. 29, 2012, issued in corresponding Korean Patent Application No. 10-2009-7021612.

* cited by examiner

FLUID DYNAMIC BEARING DEVICE

CROSS-REFERENCE TO RELATED APPLICATIONS

This Application is a national stage of International Application No. PCT/JP2008/058165 filed on Apr. 28, 2008, which claims priority for Application JP 2007-122654 filed on May 7, 2007.

TECHNICAL FIELD

The present invention relates to a fluid dynamic bearing device rotatably supporting a shaft member by a dynamic pressure action of a lubricant fluid generated in a bearing gap.

BACKGROUND ART

Due to its high rotational precision and calmness, a fluid dynamic bearing device can be suitably used in a spindle motor for an information apparatus, such as a magnetic disk drive like an HDD, an optical disk drive for a CD-ROM, CD-R/RW, DVD-ROM/RAM or the like, or a magneto-optical disk drive for an MD, MO or the like, a polygon scanner motor of a laser beam printer (LBP), a motor for a projector color wheel, or a small motor, such as a fan motor for cooling an electrical apparatus or the like.

As a fluid dynamic bearing device of this type, a fluid dynamic bearing device shown, for example, in FIG. 2 of Patent Document 1, is equipped with a cup-like housing in which a side portion and a bottom portion thereof are integrated into a unit, a bearing sleeve fixed to the inner peripheral surface of the housing, and a shaft member inserted into the inner periphery of the bearing sleeve, with the shaft body being rotatably supported by a lubricant film generated in a radial bearing gap between the inner peripheral surface of the bearing sleeve and the outer peripheral surface of the shaft member. Further, by fixing the outer peripheral surface of the housing to the inner peripheral surface of a bracket, the fluid dynamic bearing device is incorporated into a spindle motor (see FIG. 1 of the document). A plurality of (two, in the example shown) disks are mounted on this spindle motor, thus achieving an increase in the capacity of an HDD or the like.

[Patent Document 1] JP 2006-118705 A

DISCLOSURE OF THE INVENTION

Problems to be Solved by the Invention

When a plurality of disks are thus mounted on a spindle motor, the weight of the motor as a whole increases, so a large load is applied to the bearing device due to an impact load or the like. FIG. 7 solely shows a bracket 6' of a fluid dynamic bearing device and a housing 7' fixed to the inner periphery thereof. When, for example, a shaft member (not shown) whose weight has been increased through stacking of a plurality of disks abuts a bottom portion 7b' of the housing 7' to apply thereto an impact as indicated by the arrow, there is a fear of rupture being generated at a boundary portion P between a side portion 7a' and the bottom portion 7b' of the housing 7'.

Such a problem can be avoided, for example, by increasing the wall thickness of the housing bottom portion to enhance the strength of the bottom portion. However, an increase in the wall thickness of the housing bottom portion is undesirable since it will lead to an increase in the weight of the bearing device and an increase in material cost. Further, when the housing is formed of resin, an increase in the wall thickness of the bottom portion results in an increase in molding shrinkage amount, so there is a fear of deterioration in the surface precision of the inner end surface of the housing bottom portion. In particular, when the inner end surface of the housing bottom portion faces a thrust bearing gap, the width precision of the thrust bearing gap deteriorates as a result of the deterioration in the surface precision of the inner end surface, so there is a fear of a reduction in the supporting force in the thrust direction.

It is an object of the present invention to enhance the strength of the housing bottom portion without involving an increase in the weight of the bearing device, an increase in material cost, or deterioration in the dimensional precision of the housing.

BRIEF SUMMARY OF THE INVENTION

In order to solve the above-mentioned problems, the present invention provides a fluid dynamic bearing device, including: a housing which has a side portion and a bottom portion integrated with each other and whose side portion has an opening at one end and is closed at another end by the bottom portion; a shaft member accommodated in the housing; a radial bearing gap facing an outer peripheral surface of the shaft member; and a thrust bearing gap facing an inner end surface of the bottom portion of the housing, in which the bottom portion of the housing includes an outer periphery of an outer end surface thereof a protrusion protruding axially and away from the opening, and in which the protrusion is fixed to an inner peripheral surface of a bracket.

In this way, in the fluid dynamic bearing device of the present invention, the protrusion provided at the housing bottom portion is fixed to the bracket. When a thrust load is applied to the bottom portion of the housing, a part of the load is supported by the bracket via the protrusion. Thus, the strength of the boundary portion between the side portion and the bottom portion of the housing increases, making it possible to prevent rupture of the boundary portion due to an excessive thrust load. On the other hand, it is possible to make the wall thickness of the bottom portion invariable, so it is possible to suppress deformation due to molding shrinkage of the bottom portion inner end surface (thrust bearing surface) forming the thrust bearing gap.

In many cases, the boundary portion between the inner peripheral surface of the side portion and the inner end surface of the bottom portion is the most fragile portion with respect to thrust load, and rupture is generated starting from this fragile portion. When the wall thickness in the radial direction of the protrusion is made larger than that of the side portion of the housing, the axial wall thickness of the fragile portion increases, so it is possible to prevent axial rupture that starts from the fragile portion.

The protrusion is provided with a reinforcing portion which increases in radial wall thickness as it extends to reach the outer end surface of the housing bottom portion, whereby it is possible to mitigate stress concentration between the inner peripheral surface of the protrusion and the outer end surface of the bottom portion. On the other hand, the axial wall thickness of the reinforcing portion is gradually reduced inwardly, so it is possible to minimize the deformation of the thrust bearing surface due to molding shrinkage of the bottom portion.

Further, at the boundary portion between the inner peripheral surface of the housing side portion and the inner end surface of the housing side bottom portion, there is provided a U-shaped recess portion, whereby stress concentration at this portion can be mitigated, and the rupture strength of the housing is further enhanced. Due to the provision of the protrusion at the housing bottom portion, a sufficient wall thickness is secured for the housing if the U-shaped recess portion is formed, so there is no fear of a reduction in the strength of the housing.

Effects of the Invention

As described above, according to the present invention, it is possible to achieve an improvement in terms of the strength of the housing bottom portion while minimizing an increase in weight and an increase in material cost. Further, even when the housing is formed of resin, it is possible to suppress an increase in molding shrinkage amount and to maintain the requisite dimensional precision for the housing, making it possible to prevent deterioration in bearing performance.

Figure 1:
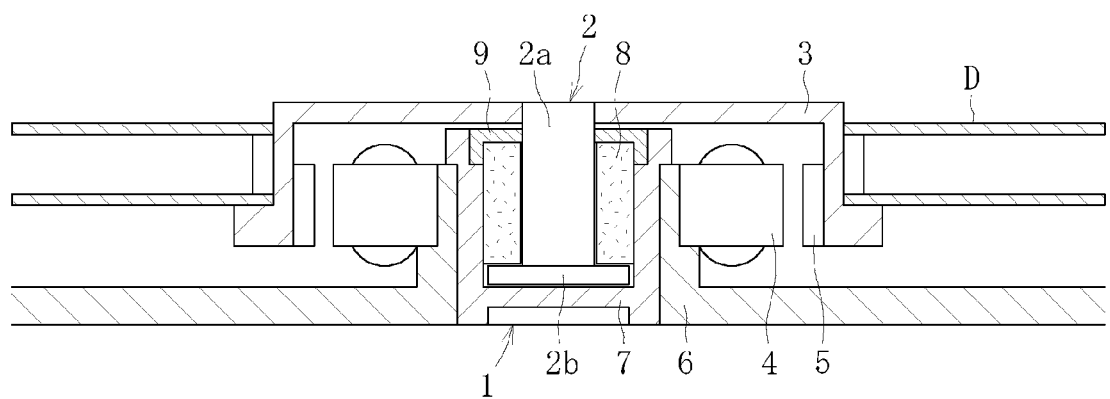
FIG. 1 is a sectional view of an HDD spindle motor with a fluid dynamic bearing device according to the present invention incorporated therein.

DESCRIPTION OF REFERENCE NUMERALS 1 dynamic pressure bearing device
2 shaft member
3 disk hub
4 stator coil
5 rotor magnet
6 bracket
7 housing
   7a side portion
   7b bottom portion
      7b3 protrusion
      7b4 reinforcing portion
   7c U-shaped recess portion
8 bearing sleeve
9 seal member
R1, R2 radial bearing portion
T1, T2 thrust bearing portion
S1, S2 seal space

BEST MODE FOR CARRYING OUT THE INVENTION

In the following, an embodiment of the present invention is described with reference to FIGS. 1 through 5.

FIG. 1 is a conceptual drawing showing an example of the construction of a spindle motor for an information apparatus into which there is incorporated a dynamic pressure bearing device (fluid dynamic pressure bearing device) 1, which is a kind of fluid dynamic bearing device. This spindle motor for an information apparatus is used in a disk drive device, such as an HDD, and is equipped with a dynamic pressure bearing device 1, a disk hub 3 attached to a shaft member 2 of the dynamic pressure bearing device 1, a stator coil 4 and a rotor magnet 5 that are opposed to each other with, for example, a radial gap therebetween, and a bracket 6. The stator coil 4 is mounted, for example, to the outer peripheral surface of the bracket 6, and the rotor magnet 5 is mounted to the inner periphery of the disk hub 3. The disk hub 3 holds at its outer periphery one or a plurality of disks D, such as magnetic disks. When the stator coil 4 is energized, the rotor magnet 5 rotates due to an electromagnetic force generated between the stator coil 4 and the rotor magnet 5, and, with that, the disk hub 3 and the shaft member 2 rotate integrally.

Figure 2:
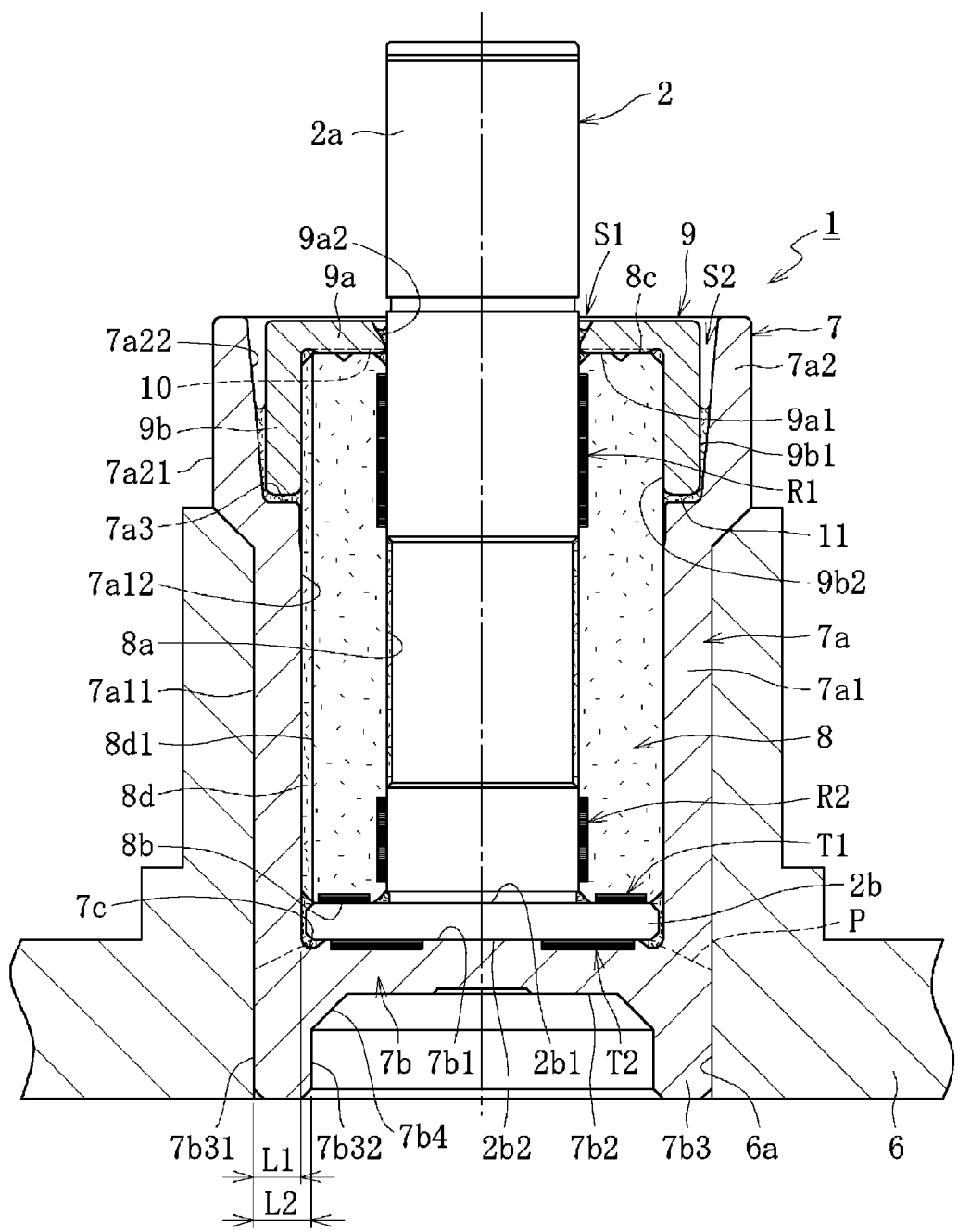
FIG. 2 is a sectional view of a fluid dynamic bearing device according to the present invention.

FIG. 2 shows an embodiment of the dynamic pressure bearing device 1 used in the above-mentioned spindle motor. The dynamic pressure bearing device 1 mainly includes the shaft member 2, a cup-shaped housing 7, a bearing sleeve 8 accommodated in the inner periphery of the housing 7, and a seal member 9 sealing an opening at one end of the housing 7. In the following, for the sake of convenience in illustration, the opening side of the housing 7 is referred to as the upper side, and the closed side thereof is referred to as the lower side.

The shaft member 2 is formed of a metal material such as stainless steel, and is equipped with a shaft portion 2a and a flange portion 2b provided integrally or separately at the lower end of the shaft portion 2a. Apart from forming the entire shaft member 2 of metal, it is also possible to form all or a part (e.g., both end surfaces) of the flange portion 2b of resin, thereby realizing a hybrid structure formed of metal and resin.

In the housing 7, a side portion 7a and a bottom portion 7b are formed integrally; one end of the side portion 7a is open, and the other end thereof is closed by the bottom portion 7b. The housing 7 is formed, for example, by resin injection molding; the resin forming the housing 7 is mainly formed of thermoplastic resin; examples of the resin that can be used include amorphous resins, such as polysulfone (PSF), polyether sulfone (PES), polyphenyl sulfone (PPSU), and polyether imide (PEI), and crystalline resins, such as liquid crystal polymer (LCP), polyetherether ketone (PEEK), polybutyrene terephthalate (PBT), and polyphenylene sulfide (PPS). There are no particular limitations regarding the filler used with the above-mentioned resin; examples of the filler that can be used include fibrous filler, such as glass fiber, whisker-like filler, such as potassium titanate, scale-like filler, such as mica, and fibrous or powdered conductive filler, such as carbon fiber, carbon black, graphite, carbon namomaterial, and metal powder. Such filler may be used singly or in a combination of two or more kinds of filler. The injection molding material for the housing 7 is not restricted to the above-mentioned ones; for example, it is also possible to use a low-melting-point metal material, such as magnesium alloy or aluminum alloy. Further, it is also possible to form the housing 7 by so-called MIM molding, in which injection molding is conducted using a mixture of metal powder and binder before performing degreasing/sintering, or by press molding of a metal material, such as a soft metal like brass.

The side portion 7a of the housing 7 includes a cylindrical small diameter portion 7a1, and a large diameter portion 7a2 arranged at one end of the small diameter portion 7a1. An outer peripheral surface 7a21 of the large diameter portion 7a2 (large diameter outer peripheral surface) has a diameter larger than that of an outer peripheral surface 7a11 of the small diameter portion 7a1 (small diameter outer peripheral surface); similarly, an inner peripheral surface 7a22 of the large diameter portion 7a2 has a diameter larger than that of an inner peripheral surface 7a12 of the small diameter portion 7a1. A boundary surface 7a3 between the inner peripheral surfaces 7a12 and 7a22 is formed as a flat surface extending in a direction orthogonal to the axial direction. On an inner end surface 7b1 of the bottom portion 7b, there is formed a dynamic pressure groove region serving as a thrust bearing surface (indicated by solid filled portions in FIG. 2); in this region, there are formed, as dynamic pressure generating portions, a plurality of dynamic pressure grooves (not shown) arranged, for example, in a spiral fashion. At the boundary portion between the inner end surface 7b1 and the small diameter inner peripheral surface 7a12 of the side portion 7a, there is formed a U-shaped recess portion 7c; due to the provision of the U-shaped recess portion 7c, the boundary portion exhibits a curved-surface configuration with no corner portion.

At the bottom portion 7b of the housing 7, there is formed a protrusion 7b3 protruding from an outer end surface 7b2 in the axial direction and away from the opening of the housing 7, that is, protruding axially downwards. In this embodiment, the protrusion 7b3 is formed in an annular configuration. An outer peripheral surface 7b31 of the protrusion 7b3 has the same diameter as the small diameter outer peripheral surface 7a11 of the side portion 7a and is formed so as to be continuous therewith, and an inner peripheral surface 7b32 of the protrusion 7b3 has a diameter smaller than that of the small diameter inner peripheral surface 7a12 of the side portion 7a. Thus, the radial wall thickness of the protrusion 7b3 is made larger than the wall thickness of the small diameter portion 7a1 of the side portion 7a. Further, the protrusion 7b3 has a reinforcing portion 7b4 increasing in the radial wall thickness as it extends to reach the outer end surface 7b2 of the bottom portion 7b of the housing 7.

Figure 7:
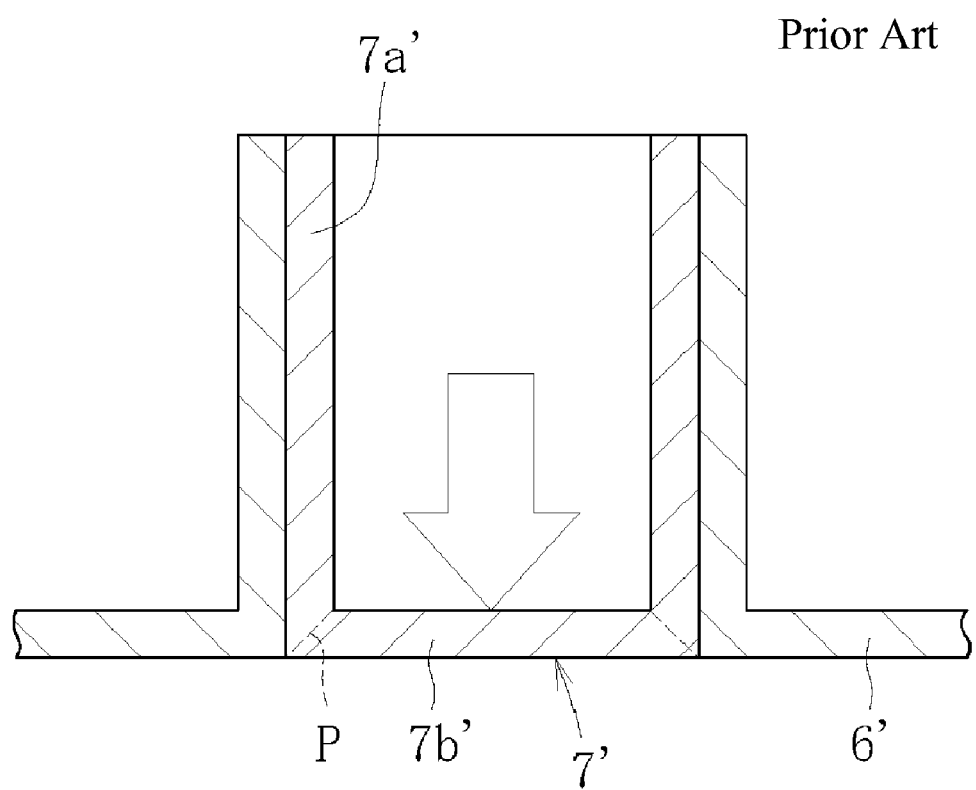
FIG. 7 is a sectional view of a conventional housing.

The outer peripheral surface of the housing 7 is fixed to an inner peripheral surface 6a of the bracket 6, for example, by bonding. At this time, not only the small diameter outer peripheral surface 7a11 of the housing 7 but also the outer peripheral surface 7b31 of the protrusion 7b3 is bonded to the bracket 6. When a thrust load as shown in FIG. 7 is applied to the bottom portion 7b of the housing 7, a part of this load is supported by the bracket 6 via the protrusion 7b3. As a result, the strength of the boundary portion (indicated by the dashed lines P in FIG. 2) between the side portion 7a and the bottom portion 7b of the housing 7 increases, making it possible to prevent rupture at this portion. Thus, the present invention can be suitably applied to a fluid dynamic bearing device for uses in which a large load is applied to the housing 7 as in the case of the disk drive device as shown in FIG. 1, in which a plurality of disks are mounted. On the other hand, the wall thickness of the bottom portion 7b can be made invariable even when the protrusion 7b3 is provided, so it is possible to suppress deformation due to molding shrinkage of the thrust bearing surface formed on the inner end surface 7b1 of the bottom portion 7b.

Further, by making the radial wall thickness of the protrusion 7b3 larger than that of the side portion 7a, the axial wall thickness of the boundary portion between the small diameter inner peripheral surface 7a12 of the side portion 7a and the inner end surface 7b1 of the bottom portion 7b, which is usually the most fragile portion, increases, so it is possible to prevent axial rupture starting from this portion.

Further, by providing the protrusion 7b3 with the reinforcing portion 7b4, it is possible to mitigate stress concentration between the inner peripheral surface 7b32 of the protrusion 7b3 and the outer end surface 7b2 of the bottom portion 7b. On the other hand, since the axial wall thickness of the reinforcing portion 7b4 gradually decreases inwardly, it is possible to minimize deformation of the thrust bearing surface due to the molding shrinkage of the bottom portion 7b. The configuration of the reinforcing portion 7b4 is not restricted to the tapered one as shown in FIG. 2; it may also be, for example, of an arcuate configuration.

Further, due to the provision of the U-shaped recess portion 7c at the boundary portion between the small diameter inner peripheral surface 7a12 of the side portion 7a and the inner end surface 7b1 of the bottom portion 7b of the housing 7, stress concentration at this portion is mitigated, and the rupture strength of the housing 7 is further enhanced. In this regard, due to the provision of the reinforcing portion 7b4 on the protrusion 7b3, it is possible to secure a sufficient wall thickness for the bottom portion 7b, so it is possible to prevent a reduction in the strength of the bottom portion 7b attributable to the provision of the U-shaped recess portion 7c.

The bearing sleeve 8 is formed in a cylindrical configuration of a porous material formed of a sintered alloy, such as a sintered metal whose main component is copper. The sintered metal is impregnated with lubricant oil. Apart from this, it is also possible to form the bearing sleeve 8 of a solid metal material, such as a soft metal like brass.

Figure 3:
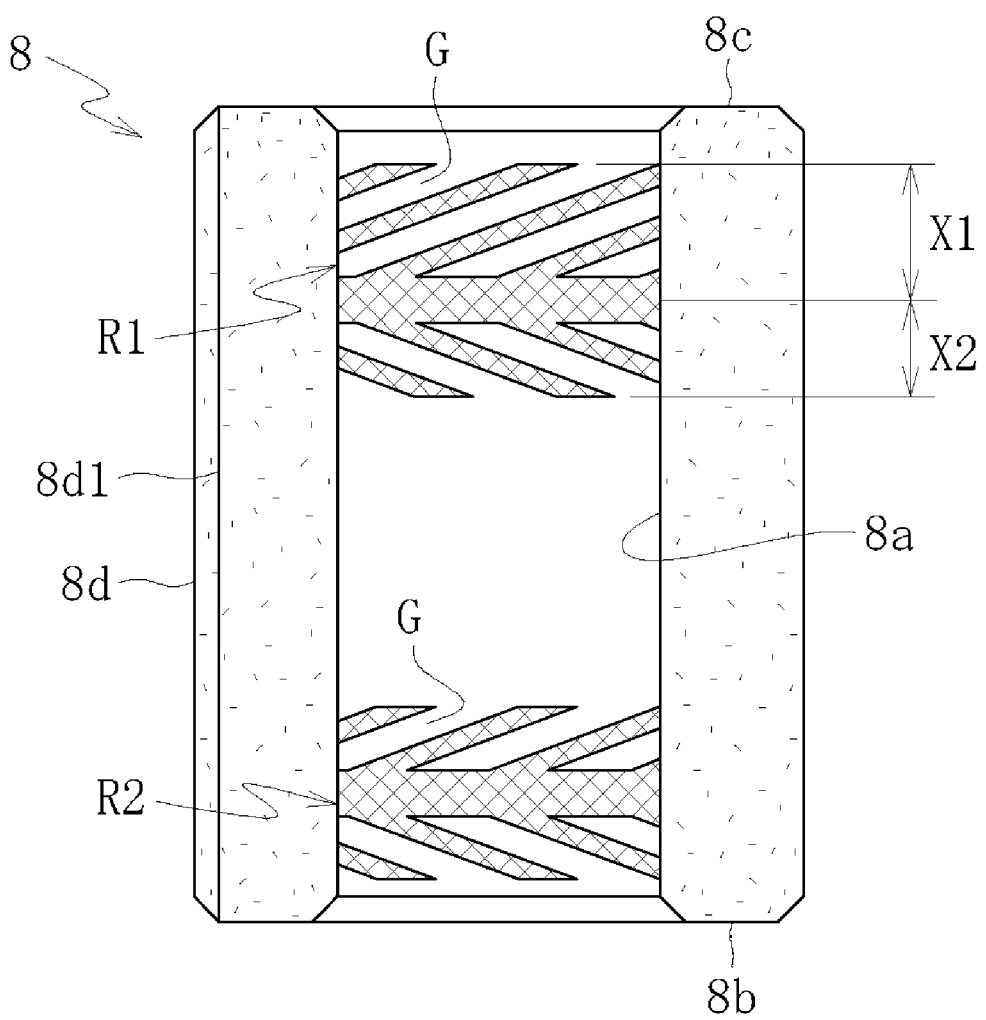
FIG. 3 is a sectional view of a bearing sleeve.

On an inner peripheral surface 8a of the bearing sleeve 8, there are provided two upper and lower dynamic pressure groove regions (indicated by solid filled portions in FIG. 2) that are axially spaced apart from each other. As shown in FIG. 3, in these two regions, there are formed, as dynamic pressure generating portions, a plurality of dynamic pressure grooves G arranged, for example, in a herringbone-like configuration. The dynamic pressure grooves G in the upper region are formed asymmetrically in the axial direction; in this region, the axial length X1 of the upper dynamic pressure grooves is somewhat larger than the axial length X2 of the lower dynamic pressure grooves (X1>X2). On the other hand, the dynamic pressure grooves G in the lower region are formed symmetrically in the axial direction; in this region, the axial lengths of the upper and lower dynamic pressure grooves G are equal to each other. It is also possible for the regions constituting the radial bearing surfaces having the dynamic pressure grooves G to be formed on the outer peripheral surface of the shaft portion 2a of the shaft member 2.

On the lower end surface 8b of the bearing sleeve 8, there is formed a dynamic pressure groove region constituting a thrust bearing surface (indicated by solid filled portions in FIG. 2). In this region, there are formed, as dynamic pressure generating portions, a plurality of dynamic pressure grooves (not shown) arranged, for example, in a spiral fashion.

At one or a plurality of positions arranged at equal circumferential intervals on an outer peripheral surface 8d of the bearing sleeve 8, there are formed axially extending circulation grooves 8d1 for circulating lubricant oil. Both ends of each circulation groove 8d1 are open in the end surfaces 8b and 8c of the bearing sleeve 8.

Figure 4:
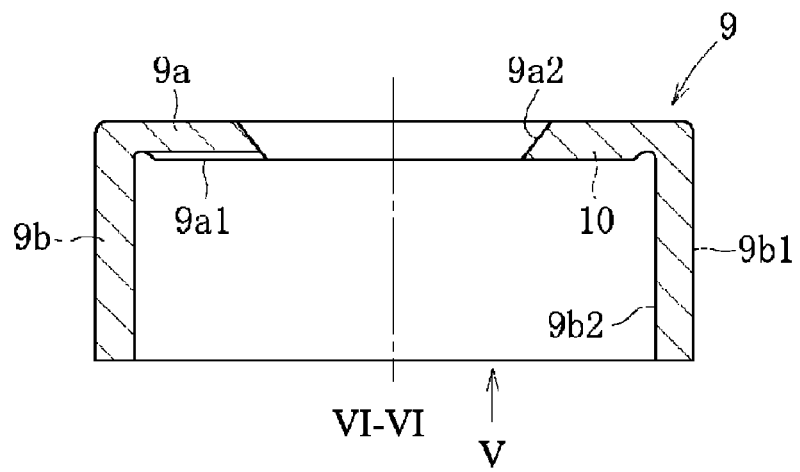
FIG. 4 is a sectional view of a seal member taken along the line V-V (see FIG. 5).
Figure 5:
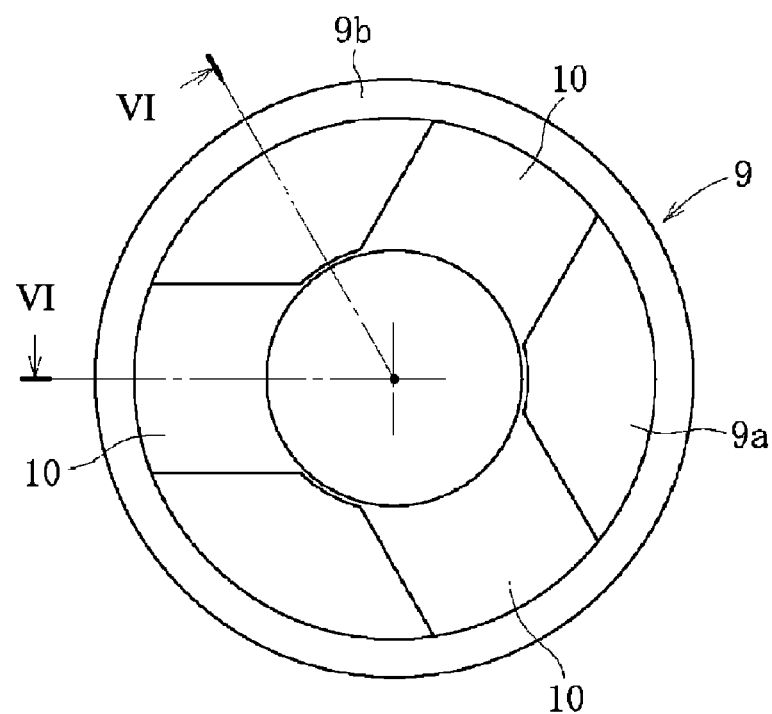
FIG. 5 is a plan view of the seal member as seen in the direction of the arrow B (see FIG. 4).

The seal member 9 is formed as an integral unit of a reverse-L-shaped sectional configuration and is formed of a disc-like first seal portion 9a and a cylindrical second seal portion 9b extending axially from one end surface 9a1 of the first seal portion 9a. Both an outer peripheral surface 9b1 and an inner peripheral surface 9b2 of the second seal portion 9b are formed in a cylindrical surface configuration, and an inner peripheral surface 9a2 of the first seal portion 9a is formed as a tapered surface that is upwardly diverged. As shown in FIGS. 4 and 5, one end surface 9a1 has a radial circulation groove 10 for circulating lubricant oil. The circulation groove 10, which extends across the end surface 9a1, is formed at one or a plurality of positions at equal circumferential intervals (at three positions in FIG. 5). The seal member 9 is formed, for example, of an injection-molded resin product; the base resin and filler that can be used are the same as those for the housing 7, so a description thereof will be omitted.

When assembling the dynamic pressure bearing device 1, the shaft member 2 is first accommodated in the housing 7, and then the bearing sleeve 8 is fixed to the inner peripheral surface of the housing 7; further, the seal member 9 is fixed to the upper end of the outer peripheral surface of the bearing sleeve 8. After that, the inner space of the housing 7 is filled with lubricant oil, whereby the dynamic pressure bearing device 1 as shown in FIG. 2 can be obtained. The fixation between the housing 7 and the bearing sleeve 8, and the fixation between the bearing sleeve 8 and the seal member 9 can be effected by press-fitting, bonding, or press-fit bonding (press-fitting with adhesive therebetween). After the assembly, the end surface 9a1 of the first seal portion 9a constituting the seal member 9 abuts the upper end surface 8c of the bearing sleeve 8, and the lower end surface of the second seal portion 9b is opposed to the boundary surface 7a3 in the inner periphery of the housing 7 with an axial gap 11 therebetween. Further, the seal member 9 is arranged on the inner side of the large diameter portion 7a2 of the housing 7.

During rotation of the shaft member 2, the two upper and lower dynamic pressure groove regions of the inner peripheral surface 8a of the bearing sleeve 8 are opposed to the outer peripheral surface of the shaft portion 2a through the intermediation of radial bearing gaps. Further, the dynamic pressure groove region constituting the thrust bearing surface on the lower end surface 8b of the bearing sleeve 8 is opposed to the upper end surface 2b1 of the flange portion 2b through the intermediation of a thrust bearing gap; further, the dynamic pressure groove region constituting the thrust bearing surface of the inner end surface 7b1 of the housing is opposed to the lower end surface 2b2 of the flange portion 2b through the intermediation of a thrust bearing gap. Further, along with rotation of the shaft member 2, a dynamic pressure of lubricant oil is generated in the radial bearing gaps, and the shaft member 2 is rotatably supported in the radial direction in a non-contact fashion by lubricant oil films formed within the radial bearing gaps. As a result, there are formed a first radial bearing portion R1 and a second radial bearing portion R2 rotatably supporting the shaft member 2 in the radial direction in a non-contact fashion. At the same time, a dynamic pressure of lubricant oil is generated in the thrust bearing gaps, and the shaft member 2 is rotatably supported in the thrust direction by the lubricant oil films formed in the two thrust bearing gaps. As a result, there are formed a first thrust bearing portion T1 and a second thrust bearing portion T2 rotatably supporting the shaft member 2 in the thrust direction in a non-contact fashion.

The inner peripheral surface 9a2 of the first seal portion 9a forms between itself and the outer peripheral surface of the shaft portion 2a a first seal space S1 having a predetermined volume. In this embodiment, the inner peripheral surface 9a2 of the first seal portion 9a is formed as a tapered surface gradually increased in diameter upwardly; thus, the first seal space S1 exhibits a tapered configuration gradually diminished downwardly. The outer peripheral surface 9b1 of the second seal portion 9a forms between itself and the large diameter inner peripheral surface 7a22 of the housing 7 a second seal space S2 having a predetermined volume. In this embodiment, the large diameter inner peripheral surface 7a22 of the housing 7 is formed as a tapered surface gradually increased in diameter upwardly; thus, the first and second seal spaces S1 and S2 exhibit a tapered configuration gradually diminished downwardly. Thus, by the drawing-in action due to a capillary force, the lubricant oil in the seal spaces S1 and S2 is drawn-in in the direction in which the seal spaces S1 and S2 are diminished in width, whereby the opening at the upper end of the housing 7 is sealed. The seal spaces S1 and S2 also have a buffer function by which they absorb a change in volume due to a change in the temperature and pressure of the lubricant oil filling the inner space of the housing 7, and the oil level is constantly within the seal spaces S1 and S2. The volume of the first seal space S1 is smaller than that of the second seal space.

It is also possible to form the inner peripheral surface 9a2 of the first seal portion 9a as a cylindrical surface, and to form the outer peripheral surface of the shaft portion 2a opposed thereto as a tapered surface; in this case, it is also possible to impart the function of a centrifugal seal to the first seal space S1, so the sealing effect is further enhanced.

As described above, the dynamic pressure grooves G of the first radial bearing portion R1 is formed asymmetrically in the axial direction, and the axial dimension X1 of the upper region is larger than the axial dimension X2 of the lower region (X1>X2). Thus, during rotation of the shaft member 2, drawing-in force to the lubricant oil due to the dynamic pressure grooves G (pumping force) is relatively large in the upper region as compared with the lower region. Further, due to this difference in drawing-in force, the lubricant oil filling the gap between the inner peripheral surface 8a of the bearing sleeve 8 and the outer peripheral surface of the shaft portion 2a flows downwards, and circulates through the route: the thrust bearing gap of the first thrust bearing portion T1→the axial circulation groove 8d1→the radial circulation groove 10 before being drawn into the radial bearing gap of the first radial bearing portion R1 again.

In this way, the lubricant oil flows and circulates through the interior of the housing 7, whereby it is possible to prevent a phenomenon in which the pressure of the lubricant oil filling the interior of the housing 7 becomes locally negative, making it possible to solve the problems, such as generation of bubbles due to generation of negative pressure and generation of lubricant oil leakage and vibration due to generation of bubbles. This circulation route for the lubricant oil communicates with the first seal space S1, and further, with the second seal space S2 via the axial gap 11, so, even when bubbles are allowed to be mixed into the lubricant oil for some reason or other, such bubbles are discharged into the atmosphere via the oil surfaces (gas/liquid interfaces) in the seal spaces S1 and S2 when the bubbles circulate with the lubricant oil, thus preventing the adverse effect of the bubbles even more effectively.

Unless negative pressure is generated, the relationship of the axial dimensions of the dynamic pressure grooves G may be reversed from the above-mentioned relationship (X1<X2). Alternatively, when there is no need to thus forcibly cause the lubricant oil to flow through the radial bearing gaps, the dynamic pressure grooves G may be formed in an axially symmetrical configuration with respect to the annular flat portion. Further, the axial circulation groove 8d1 may be formed in the inner peripheral surface of the housing 7, and the radial circulation groove 10 may be formed in the upper end surface 8c of the bearing sleeve 8.

Figure 6:
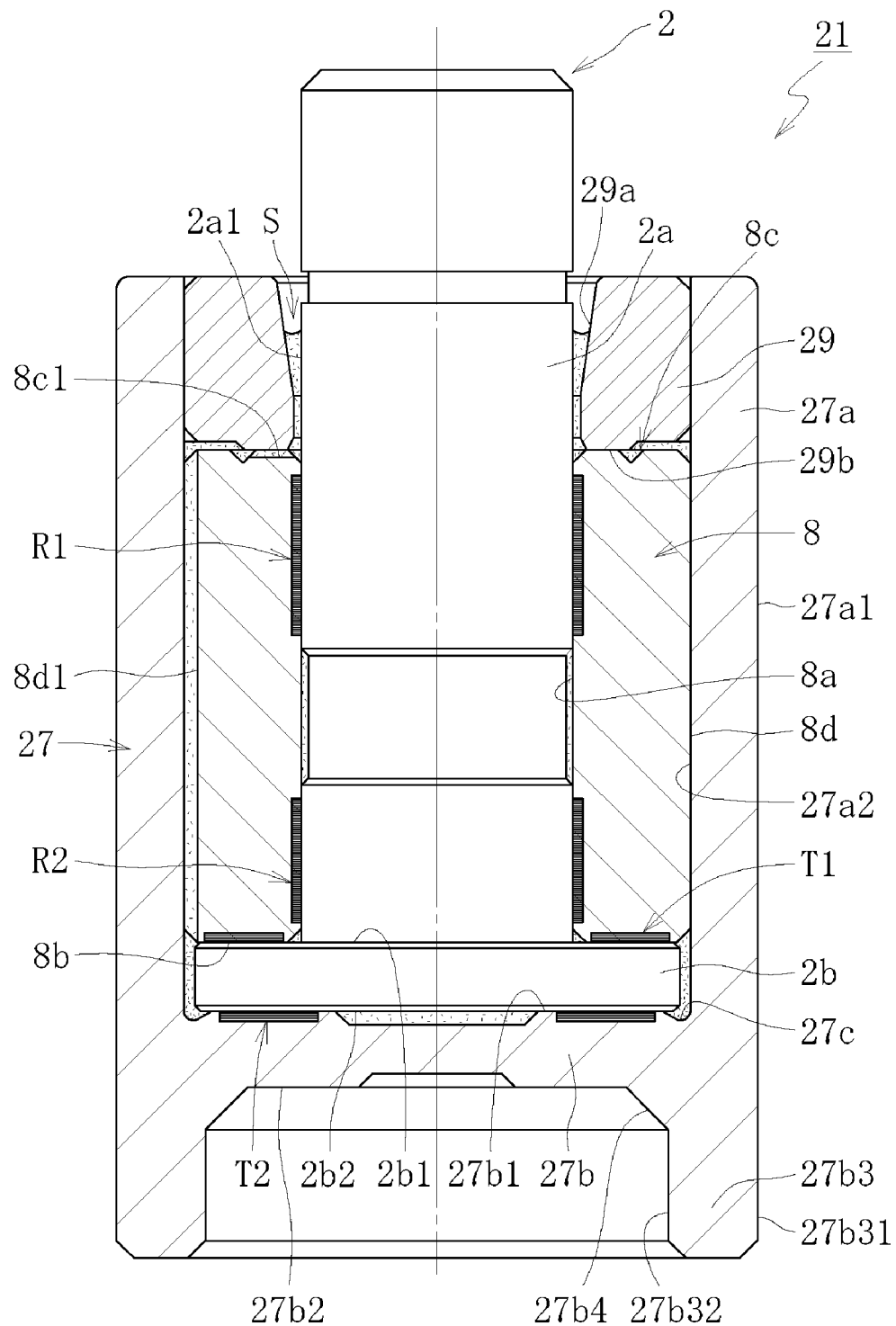
FIG. 6 is a sectional view of a fluid dynamic bearing device according to another embodiment of the present invention.

The present invention is not restricted to the above-mentioned embodiment. FIG. 6 shows a fluid dynamic bearing device 21 according to another embodiment of the present invention. The fluid dynamic bearing device 21 differs from that of the above-mentioned embodiment in that the seal space S is provided at only one position. A housing 27 of the fluid dynamic bearing device 21 includes a cylindrical side portion 27a and a bottom portion 27b, and a seal member 29 is fixed to an inner peripheral surface 27a2 of the side portion 27a of the housing 27. The seal space S is formed between an inner peripheral surface 29a of the seal member 29 and the outer peripheral surface 2a1 of the shaft portion 2a. On the inner peripheral surface 29a of the seal member 29, there is formed a tapered surface gradually reduced in diameter as it extends downwards, so the seal space S has a wedge-like configuration whose gap width is reduced downwardly. Further, the radial groove 8c1 is formed in the upper end surface 8c of the bearing sleeve 8, and communication is established between the thrust bearing gap of the first thrust bearing portion T1 and the seal space S through the radial groove 8c1 and the axial groove 8d1 formed in the outer peripheral surface 8d of the bearing sleeve 8. The other components of the housing 27, that is, a protrusion 27b3, a reinforcing portion 27b4, and a U-shaped recess portion 27c respectively correspond to the protrusion 7b3, the reinforcing portion 7b4, and the U-shaped recess portion 7c of the housing 7 of the above-mentioned embodiment. Otherwise, the fluid dynamic bearing device 21 is of the same construction as that of the above-mentioned embodiment, so a redundant description thereof will be omitted.

While in the above-mentioned embodiment the dynamic pressure generating portions of the radial bearing portions R1 and R2 and the thrust bearing portions T1 and T2 are formed in the inner peripheral surface 8a and the lower end surface 8b of the bearing sleeve 8 and the inner end surface 7b1 of the housing 7, it is also possible to form them in the surfaces opposed to these surfaces through the intermediation of the bearing gaps, that is, in the outer peripheral surface 2a1 of the shaft portion 2a and the upper end surface 2b1 and the lower end surface 2b2 of the flange portion 2b.

Further, while in the above-mentioned embodiments the radial bearing portions R1 and R2 and the thrust bearing portions T1 and T2 generate the dynamic pressure action of the lubricant oil by the dynamic pressure grooves of a herringbone-like and a spiral configuration, it is also possible to adopt, as the radial bearing portions R1 and R2, so-called step bearings, corrugated bearings, or multi-arc bearings, and to adopt, as the thrust bearing portions T1 and T2, step bearings or corrugated bearings. Further, it is also possible to adopt, as the radial bearing portions R1 and R2, so-called cylindrical bearings having no dynamic pressure generating portions, and to adopt, as the thrust bearing portions T1 and T2, pivot bearings supporting the end portion of the shaft member in a contact fashion.

Further, while in the above-mentioned embodiments the radial bearing portions R1 and R2 are axially spaced apart from each other, they may also be provided so as to be continuous with each other in the axial direction. Alternatively, it is also possible to provide only one of these radial bearing portions.

Further, while in the above-mentioned embodiments a lubricant oil is used as the lubricant filling the inner space of the fluid dynamic bearing device, this should not be construed restrictively; it is also possible to use, for example, a gas such as air, lubricant grease, magnetic fluid, etc.

Further, the dynamic pressure bearing device of the present invention is not restricted to a spindle motor as described above to be used in a disk drive device such as an HDD; it is also suitably applicable to the supporting of the rotary shaft of a small motor for an information apparatus used under high speed rotating condition, such as a spindle motor for driving an optical disk or a magneto-optical disk or a polygon scanner motor in a laser beam printer, or a fan motor for cooling an electrical apparatus.

The invention claimed is:

1. A fluid dynamic bearing device comprising:
   a cup-shaped housing made of a single piece member having a side portion and a bottom portion;
   a shaft member accommodated in the housing;
   a radial bearing gap facing an outer peripheral surface of the shaft member; and
   a thrust bearing gap facing an inner end surface of the bottom portion of the housing,
   wherein the bottom portion of the housing includes a protrusion protruding axially downward extending from an outer periphery of an outer end surface of the bottom portion
   wherein the protrusion is fixed to an inner peripheral surface of a bracket, and
   wherein an inner diameter surface of the protrusion is provided at an inner side of a boundary portion between an inner peripheral surface of the side portion and an inner end surface of the bottom portion.

2. A fluid dynamic bearing device according to claim 1, wherein the protrusion has a radial wall thickness which is larger than a radial wall thickness of the side portion of the housing.

3. A fluid dynamic bearing device according to claim 1, wherein the protrusion includes a reinforcing portion which is increased in radial wall thickness as the reinforcing portion extends to reach the outer end surface of the bottom portion of the housing.

4. A fluid dynamic bearing device according to any one of claims 1 through 3, further comprising a U-shaped recess portion provided at a boundary portion between an inner peripheral surface of the side portion of the housing and the inner end surface of the bottom portion thereof.

* * * * *